United States Patent [19]

Meister et al.

[11] Patent Number: 6,060,105

[45] Date of Patent: May 9, 2000

[54] PREPARATION OF A CONCENTRATED-MILK-BASE FLAVORING AGENT

[75] Inventors: Niklaus Meister, Grosshoechstetten; Martin Vikas, Konolfingen, both of Switzerland

[73] Assignee: Nestec S.A., Vevey, Switzerland

[21] Appl. No.: 08/943,736

[22] Filed: Oct. 3, 1997

[30] Foreign Application Priority Data

Oct. 4, 1996 [EP] European Pat. Off. ............. 96202769

[51] Int. Cl.[7] .................. A23C 1/12; A23C 1/14; A23C 1/16

[52] U.S. Cl. .............. 426/580; 426/584; 426/585; 426/586; 426/587; 426/650; 426/654

[58] Field of Search .................... 426/580, 584, 426/585, 586, 587, 654, 650

[56] References Cited

U.S. PATENT DOCUMENTS

| | | | |
|---|---|---|---|
| 2,101,374 | 12/1937 | Tucker | 426/584 |
| 2,473,493 | 6/1949 | Otting et al. | 99/55 |
| 2,924,531 | 2/1960 | Stewart et al. | 426/584 |
| 3,119,702 | 1/1964 | Leviton et al. | 99/212 |
| 3,126,283 | 3/1964 | Noznick et al. | 99/55 |
| 5,223,299 | 6/1993 | Dalan et al. | 426/587 |
| 5,229,159 | 7/1993 | Schwan | 426/587 |
| 5,518,751 | 5/1996 | de Boer et al. | 426/587 |

FOREIGN PATENT DOCUMENTS

| | | | |
|---|---|---|---|
| 0627169 | 7/1994 | European Pat. Off. | A23C 1/12 |
| 0616774 | 12/1994 | European Pat. Off. | A23G 9/02 |
| 2665056 | 1/1992 | France | A23C 9/156 |
| 3726487 | 12/1987 | Germany . | |
| 4434400 | 3/1996 | Germany | A23C 9/18 |
| 9608154 | 3/1996 | WIPO . | |

OTHER PUBLICATIONS

Lang, F., et. al., "A Study of the Manufacture and Packaging of Dairy Specialties in France", The Milk Industry, vol. 67, No. 5, 1970.

Database Abstract, Derwent Information Ltd., WPI Accession No. 96–161080/199617, abstract of German Patent Application Publication No. DE 44 34 400 A1 (1996) (Effective Apr., 1996).

Database Abstract, Derwent Information Ltd., WPI Accession No. 92–116500/199215, abstract of French Patent Application Publication No. FR 2 665 056 A1 (1992).

Database Abstract, Derwent Information, Ltd., WPI Accession No. 87–343126/198749, Abstract of German Patent Application Publication No. DE 37 26 487 A1 (1987).

Database Abstract, Derwent Information Ltd., WPI Accession No. 82–97079E/198245, Abstract of Soviet Patent Document No. SU 897 198 (1982).

*Primary Examiner*—Helen Pratt
*Attorney, Agent, or Firm*—Vogt & O'Donnell, LLP

[57] ABSTRACT

A concentrated milk-base composition which includes stabilizing salt, sugar and flavoring agent components is prepared for flavoring a beverage, particularly for flavoring a coffee or tea beverage. The composition is prepared by mixing and homogenizing a milk fat with skimmed milk to obtain a milk base, subjecting the milk base to evaporation to obtain a concentrated milk base, homogenizing the concentrated milk base, cooling the homogenized milk base, adding a stabilizing salt and sucrose in dry form, and in one embodiment, a flavorant agent is added also to the cooled milk base and then the composition is heated to sterilize it, the sterilized composition is homogenized and then is filled in a package, and in another embodiment, a flavorant composition is added aseptically to the sterilized composition before homogenizing.

14 Claims, No Drawings

PREPARATION OF A CONCENTRATED-MILK-BASE FLAVORING AGENT

BACKGROUND OF THE INVENTION

The present invention relates to agents for flavoring beverages, particularly for coffee and tea, and their preparation and in particular to preparation of milk-based flavoring agents and more particularly to flavoring agents prepared with a concentrated milk base.

A flavoured condensed milk is known for example from German Patent Application Publication No. DE 44 34 400. As disclosed, the condensed milk which is packaged in portions with the object of serving as a whitening and flavouring agent for a beverage of the coffee or tea type. In an unsweetened version, a product of this type is prepared by concentrating a milk by evaporation, the fat content of which has been adjusted by adding a flavouring concentrate thereto, by homogenizing it, by sterilizing it in-line and by packaging it in portions in an aseptic manner. In order to prepare a sweetened version, the milk, standardized in fats, is mixed with a sugar syrup, it is concentrated by evaporation, a flavouring concentrate is added to it, it is homogenized, it is seeded with lactose and it is then packaged, these operations being no different from the conventional preparation of sweetened concentrated milk, the high sugar content of which enables it to keep.

SUMMARY OF THE INVENTION

The present aim of the invention is to manufacture a milk-based flavouring agent for a beverage, in particular coffee or tea, being offered in long-life portions, with a high flavouring power.

In the process according to the invention, a milk base is prepared by mixing milk fats with skimmed milk, thoroughly homogenizing the mixture, concentrating the mixture by evaporation, cooling it, preheating it, heat treating it by UHT, aseptically homogenizing it and aseptically filling it, and the process of the invention is characterized in that a stabilizing salt, a sugar and flavouring are added to the milk base before or following evaporation.

DETAILED DESCRIPTION OF THE INVENTION

In order to put the process of the present invention into practice, a standardized milk base is prepared, that is to say the respective quantities by weight of fats and non-fat solids are adjusted to desired values by adding to the milk base, according to need, for example skimmed milk, cream or anhydrous milk fats. Preferably, a mixture of pasteurized skimmed milk and pasteurized cream or anhydrous milk fats is standardized to have a desired fat content, preferably about 15% by weight.

The standardized mixture is preheated to 50–100° C. and is then homogenized under intensive conditions. The aim of the homogenization is to increase the physical stability of the mixture so as to prevent phase separation during subsequent processing and storage of the final product, by increasing the surface area of the fat globules so as to bind their proteins better and thus to compensate for the relative insufficiency of the membranous lipids. Intensive homogenization is understood to mean that the mixture is processed in one or more passes through a homogenizer with one or more stages at pressures from 50 to 500 bar, preferably in one pass in one stage at approximately 300 bar.

The homogenization treatment is desirable for certain aromatizations and aims at preventing fat separation during storage. The milk base is then standardized with pasteurized skimmed milk in order to obtain a desired weight ratio fat to non-fat solids, preferably of about 0.23–0.24.

The heat treated homogenized material is then processed so as to stabilize the bonds between the proteins, so that they exist after concentration by evaporation. This heat treatment may take place by direct or indirect heating in any normal apparatus enabling the liquid to be kept at 80–150° C. for 1 to 1200 s. The upper temperature limit naturally corresponds to the lower time limit. Accordingly, it is possible for example to combine a plate exchanger with a holding tube and a regulated counter-pressure valve, two plate exchangers connected by a holding tube or a plate exchanger associated with a regulated counter-pressure valve and a thermostatically controlled holding vessel.

After this heat treatment, the liquid is concentrated by evaporation with expansion in a single effect or preferably a multiple effect evaporator with a falling float, to a dry matter content of 30 to 40% and preferably 33 to 37% by weight.

In the case of addition of sucrose before evaporation, concentration takes place at a dry matter >55%, preferably of about 60% by weight.

Once concentrated, the liquid is preferably homogenized once again, preferably in one passage through a one-stage homogenizer at approximately 250 bar. The aim of this second homogenization is to disintegrate the agglomerates of fat globules which could be formed during the concentration step by evaporation and where necessary to reduce still further the size of these fat globules.

The homogenized concentrate is preferably cooled to a temperature of <10° C. A stabilising salt, which may be selected from phosphates and citrates, then is added, for example at a level of 0.05 to 0.35% by weight, together with a flavouring and a sugar, in dry form. The quantity of sucrose may be 5 to 40% by weight of the dry matter of the final product and preferably corresponds to approximately half of that which is usually found in a sweetened concentrated milk, i.e. approximately 30% of the dry matter of the final product.

As flavouring, any flavouring concentrate may for example be used on a lipidic, aqueous, alcoholic, or liqueur type support or a mixture of these diluents. The flavours of choice are chocolate, cocoa, vanilla, orange, chestnut, cinnamon, almond (Amaretto), Baileys cream, or whisky cream to quote but a few examples. The quantity of flavouring used may represent, according to its nature, preferably 0.05 to 5% by weight of the dry matter of the final product.

When this mixture is prepared, the proportions are selected so that the milk solids represent approximately 20 to 25% of the final product.

The flavoured milk base is then finally sterilized. Heat treatment is carried out in-line by UHT. In order to do this, the liquid is preheated to 50–90° C., it is sterilized in-line by direct or indirect heating, preferably at 120–145° C. for a few seconds to a few minutes, the upper temperature limit corresponding to the lower time limit. The product is then cooled to 50–90° C., for example by flash expanion, and is then homogenized by one or more passes and in one or more stages, preferably in one pass at 200–250 bar in the first stage followed by approximately 50 bar in the second stage.

The product is then cooled to 4–30° C., preferably to approximately 20° C. and is packaged in portions in packages, for example bricks or small pots. All the operations follow sterilization are of course carried out in an aseptic manner.

According to a variant of the flavouring addition, applicable in particular to heat-sensitive flavours, for example those diluted with alcohol, such as for example ethanol or propane diol, this is carried out in an aseptic manner in the sterilized sweetened milk base.

According to a variant of the sugar addition, this may take place before the preheating preceding the first heat treatment, i.e. before the concentration by evaporation step, in which case homogenization after evaporation is not necessary.

According to a variant of the stabilizing salt addition, the latter may be added before the preheating preceding the first heat treatment or just before the concentration by evaporation step.

EXAMPLE

The following examples illustrate the invention. In these, percentages and parts are by weight, unless indicated to the contrary.

Example 1

Pasteurized cream and pasteurized skimmed milk were standardized so as to obtain a milk base with 15% fats. After preheating to 80° C., the liquid was homogenized at this temperature in one pass and one stage at 300 bar, and was then cooled to a temperature of <100° C. After preheating to 75° C., the liquid was heat treated at 118° C. for 156 s and was then concentrated by evaporation to 33–37% dry matter. After preheating to 650° C., the concentrate was homogenized in one pass and with one stage at 250 bar, and was then cooled to a temperature of <100° C.

A solution of disodium hydrogenphosphate in deionized water was then added as well as granulated sugar and a powdered flavouring with stirring for 20 min until dissolution was complete. After preheating to 80° C., the mixture was sterilized by direct steam injection at 122° C. for 6 min, it was cooled to 75° C. by flash expansion, homogenized in one pass in two steps, first of all at 250 bar, then at 50 bar, it was cooled and then packaged in small pots. All operations following sterilization took place aseptically.

The composition (%) of the flavoured concentrated milks obtained is shown in Table 1 below.

TABLE 1

| Ingredient | Irish cream | Amaretto | Vanilla | Cinnamon |
| --- | --- | --- | --- | --- |
| Milk fats | 4 | 4 | 4 | 4 |
| Non-fat milk solids | 17 | 17 | 17 | 17 |
| Sucrose | 30 | 30 | 30 | 30 |
| Baileys cream flavour | 2.5 | — | — | — |
| Amaretto flavour | — | 0.8 | — | — |
| Vanilla flavour | — | — | 3 | — |
| Cinnamon flavour | — | — | — | 0.08 |
| Vanilla flavour | — | — | — | 0.06 |
| Na$_2$PO$_4$.2H$_2$O | 0.22 | 0.22 | 0.22 | 0.22 |
| Water | 46.28 | 47.98 | 45.28 | 48.64 |

The products prepared according to the invention were perfectly suitable for flavouring coffee or tea.

Example 2

Pasteurized cream and pasteurized skimmed milk were standardized so as to obtain a milk base with 15% fats. After preheating to 80° C., the liquid was homogenized at this temperature in one pass and one stage at 300 bar, and it was then cooled to a temperature of <10° C. and standardized with pasteurized skimmed milk in a ratio fats/non-fat solids of about 0.23–0.24. Granulated sugar was added to the liquid. After preheating to 75° C., it was heat treated at 120° C. for 120 s, and then concentrated by evaporation to >55% dry matter and cooled to a temperature of <100° C. A solution of disodium hydrogenphosphate in deionized water was then added as well as a powdered flavouring with stirring for 20 min until dissolution was complete. After preheating to 80° C., the mixture was sterilized by direct steam injection at 125° C. for 6 min, it was cooled to 75° C. by flash expansion, homogenized in one pass in two steps, first of all at 250 bar, then at 50 bar, it was cooled and then packaged in small pots. All operations following sterilization took place aseptically. The product obtained had the same composition and the same properties as that prepared according to Example 1.

We claim:

1. A process for preparing a composition for flavoring a beverage comprising:

(i) carrying out steps wherein the steps consist essentially of mixing milk fat with skimmed milk to obtain a milk and fat mixture, heating the mixture to a temperature of from 50° C. to 100° C. to obtain a heated mixture, homogenizing the heated mixture under intensive conditions to obtain an homogenized milk base and subjecting the homogenized milk base to evaporation to concentrate the milk base to obtain a concentrated milk base; and (ii) carrying out further steps which comprise:

homogenizing the concentrated milk base to reduce fat globule size to obtain a homogenized concentrated milk base;

cooling the homogenized concentrated milk base to a temperature of less than 10° C. to obtain a cooled concentrated milk base:

adding substances to the cooled milk base, wherein the substances added comprise (i) a stabilizing salt selected from the group consisting of phosphate and citrate salts, (ii) sucrose in a dry form and (iii) a flavoring agent substance, to obtain a flavorant composition wherein, by weight based upon flavorant composition weight, the stabilizing salt is in an amount of from 0.05% to 0.35% and wherein, by weight based upon flavorant composition dry matter weight, the sucrose is in an amount of from 5% to 40%;

heating the flavorant composition to a temperature of from 50° C. to 90° C. for obtaining a heated composition for sterilization and then UHT-heating the heated composition to sterilize the composition to obtain a sterilized composition;

aseptically homogenizing the sterilized composition to obtain a homogenized sterilized composition; and aseptically filling a package with the homogenized sterilized composition.

2. A process for preparing a composition for flavoring a beverage comprising:

(i) carrying out steps wherein the steps consist essentially of mixing milk fat with skimmed milk to obtain a milk and fat mixture, heating the mixture to a temperature of from 500° C. to 100° C. to obtain a heated mixture, homogenizing the heated mixture under intensive conditions to obtain an homogenized milk base and subjecting the homogenized milk base to evaporation to concentrate the milk base to obtain a concentrated milk base; and (ii) carrying out further steps which comprise:

homogenizing the concentrated milk base to reduce fat globule size to obtain a homogenized concentrated milk base;

cooling the homogenized concentrated milk base to a temperature of less than 10° C. to obtain a cooled concentrated milk base:

adding substances to the cooled milk base, wherein the substances added comprise (i) a stabilizing salt selected from the group consisting of phosphate and citrate salts and (ii) sucrose in a dry form to obtain a sweetened salt-stabilized composition wherein, by weight based upon composition weight, the stabilizing salt is in an amount of from 0.05% to 0.35% and wherein, by weight based upon composition dry matter weight, the sucrose is in an amount of from 5% to 40%;

heating the composition to a temperature of from 50° C. to 90° C. for obtaining a heated composition for sterilization and then UHT-heating the heated composition to sterilize the composition to obtain a sterilized composition;

aseptically adding a flavorant agent substance to the sterilized composition to obtain a flavorant composition;

aseptically homogenizing the sterilized composition to obtain a homogenized sterilized composition; and aseptically filling a package with the homogenized sterilized composition.

3. A process according to claim 1 or 2 wherein the flavoring agent is added so that by weight, based upon the flavorant composition weight, the flavoring agent is in an amount of from 0.05% to 5%.

4. A process according to claim 1 or 2 wherein the skimmed milk and milk fat are mixed in amounts, and wherein the milk base is evaporated and the substances are added to the cooled milk base in amounts so that, by weight based upon the flavorant composition weight, the flavorant composition comprises skimmed milk solids in an amount of from 20% to 25%.

5. A process according to claim 4 wherein the milk base is evaporated and concentrated to a dry matter content, by weight, of from 30% to 40%.

6. A process according to claim 4 wherein the skimmed milk and milk fat are mixed in amounts so that the flavorant composition has a weight ratio of fat to non-fat solids of about 0.23 to 0.24.

7. A process according to claim 6 wherein the sucrose is in an amount of approximately 30%.

8. A process according to claim 4 further comprising adding pasteurized skimmed milk to the cooled milk base so that the flavorant composition has a weight ratio of fat to non-fat solids of about 0.23 to 0.24.

9. A process according to claim 1 or 2 further comprising, prior to homogenizing the sterilized composition, cooling the sterilized composition to a temperature of from 50° C. to 90° C. and then homogenizing the cooled composition.

10. A process according to claim 1 or 2 wherein the flavoring agent is selected from the group consisting of chocolate, cocoa, vanilla, orange, chestnut, cinnamon, almond and Baileys cream.

11. A process according to claim 1 or 2 wherein the flavoring agent is selected from the group consisting of chocolate, cocoa, vanilla, orange, chestnut, cinnamon, almond and Baileys cream.

12. A process according to claim 1 or 2 wherein the flavoring agent comprises a flavor composition and a diluent support wherein the support is selected from the group consisting a lipidic support, an aqueous support, an alcoholic support, and a liqueur support.

13. A process according to claim 12 wherein the flavoring agent is selected from the group consisting of chocolate, cocoa, vanilla, orange, chestnut, cinnamon, almond and Baileys cream.

14. A process according to claim 2 wherein the flavoring agent comprises a flavor composition and a diluent support selected from the group consisting of an alcoholic support and a liqueur support.

* * * * *

UNITED STATES PATENT AND TRADEMARK OFFICE
CERTIFICATE OF CORRECTION

PATENT NO. : 6, 060, 105
DATED : May 9, 2000
INVENTOR(S) : Niclaus MEISTER, et al.

It is certified that error appears in the above-identified patent and that said Letters Patent is hereby corrected as shown below:

Column 4, line 65 (line 6 of Claim 3), delete " 500° " and insert therefor -- 50° --.

Signed and Sealed this

Third Day of April, 2001

Attest:

NICHOLAS P. GODICI

Attesting Officer    Acting Director of the United States Patent and Trademark Office